United States Patent [19]

Kusano et al.

[11] Patent Number: 5,933,422
[45] Date of Patent: Aug. 3, 1999

[54] COMMUNICATION NETWORK RECOVERABLE FROM LINK FAILURE USING PRIORITIZED RECOVERY CLASSES

[75] Inventors: Toshihiko Kusano; Hiroshi Suzuki, both of Tokyo, Japan

[73] Assignee: NEC Corporation, Japan

[21] Appl. No.: 08/915,290

[22] Filed: Aug. 20, 1997

[30] Foreign Application Priority Data

Aug. 20, 1996 [JP] Japan ................................. 8-218776

[51] Int. Cl.⁶ ...................................................... G06F 17/30
[52] U.S. Cl. ................... 370/331; 370/228; 340/825.01; 395/182.01; 709/239; 714/4
[58] Field of Search ..................... 370/228, 232, 370/331, 391, 395, 397, 399, 411, 418; 714/4; 340/825.01; 709/239; 395/200.53, 200.54, 200.55, 200.56, 182.02

[56] References Cited

U.S. PATENT DOCUMENTS

| 5,235,599 | 8/1993 | Nishimura | 340/825.01 |
| 5,333,131 | 7/1994 | Tanabe | 370/397 |
| 5,539,744 | 7/1996 | Chu | 370/397 |
| 5,633,868 | 5/1997 | Baldwin | 370/331 |
| 5,654,962 | 8/1997 | Rostoker | 370/272 |
| 5,715,237 | 2/1998 | Akiyoshi | 370/228 |
| 5,887,127 | 3/1999 | Saito | 395/182.02 |

FOREIGN PATENT DOCUMENTS

| 481447 | 4/1992 | European Pat. Off. |
| 700230 | 3/1996 | European Pat. Off. |
| 724374 | 7/1996 | European Pat. Off. |
| 3-48553 | 3/1991 | Japan |
| 6-315033 | 11/1994 | Japan |
| 7-235923 | 9/1995 | Japan |
| 9-93260 | 4/1997 | Japan |

OTHER PUBLICATIONS

"Communication network recoveragble fromlink failure using prioritized recovery classes", Toshihiko Kusano et al, NEC Corporatioin, pp. 1–8 (DIALOG), Mar. 11, 1998.

Primary Examiner—Thomas G. Black
Assistant Examiner—Diane D. Mizrahi
Attorney, Agent, or Firm—Ostrolenk, Faber, Gerb & Soffen, LLP

[57] ABSTRACT

In a self-healing network, virtual paths between user terminals are classified according to different fault recovery priority levels and communication links are mapped to virtual paths accommodated by the links and to bandwidths remaining in the respective links. Each priority level guarantees a fault recovery with a different amount of network resource. In response to a fault-indicating message identifying a failed virtual path, a search is made through the link-path table for an alternate virtual path and a remaining bandwidth of each link that comprises the alternate virtual path in descending order of the priority classes. In accordance with the priority class of the failed virtual path relative to the priority class of an existing virtual path that shares the same link with the alternate virtual path, a decision is made on whether or not the bandwidth guaranteed by the priority class of the failed virtual path can be allocated to the alternate virtual path from the remaining bandwidth. If the decision is affirmative, the alternate virtual path is established.

20 Claims, 8 Drawing Sheets

PATH MANAGEMENT TABLE 80

| PATH | TERMINAL NODES | | FAULT RECOVERY CLASS | BANDWIDTH IN USE (Mbps) |
|---|---|---|---|---|
| 50a | 20a | 20b | 100% GUARANTEED | 50 |
| 50b | 20a | 20f | MINIMUM GUARANTEED | 30 |
| 50c | 20a | 20e | CONNECTION GUARANTEED | 5 |
| 50d | 20a | 20e | 100% GUARANTEED | 60 |
| 50e | 20a | 20e | MINIMUM GUARANTEED | 30 |
| 50f | 20c | 20f | CONNECTION GUARANTEED | 5 |
| 50g | 20c | 20d | 100% GUARANTEED | 20 |

PATH MANAGEMENT TABLE 80

| PATH | TERMINAL NODES | | FAULT RECOVERY CLASS | BANDWIDTH IN USE (Mbps) |
|---|---|---|---|---|
| 50a | 20a | 20b | 100% GUARANTEED | 50 |
| 50b | 20a | 20f | MINIMUM GUARANTEED | 30 |
| 50c | 20a | 20e | CONNECTION GUARANTEED | 5 |
| 50d | 20a | 20e | 100% GUARANTEED | 60 |
| 50e | 20a | 20e | MINIMUM GUARANTEED | 30 |
| 50f | 20c | 20f | CONNECTION GUARANTEED | 5 |
| 50g | 20c | 20d | 100% GUARANTEED | 20 |

FIG. 4A

LINK-PATH TABLE

| LINK | ACCOMMODATED PATHS (Bandwidth Used) | | | | | | | REMAINING BANDWIDTH (Mbps) |
|---|---|---|---|---|---|---|---|---|
| | 50a (50) | 50b (30) | 50c (5) | 50d (60) | 50e (30) | 50f (5) | 50g (20) | |
| 30a | ○ | ○ | ○ | | | | | 65 |
| 30b | | | | ○ | ○ | | | 60 |
| 30c | | | | | | | ○ | 130 |
| 30d | ○ | ○ | | | | | ○ | 50 |
| 30e | | | ○ | | | | | 145 |
| 30f | | | | ○ | ○ | ○ | | 55 |
| 30g | | ○ | | | | | | 120 |
| 30h | | | | | | ○ | | 145 |

LINK-PATH TABLE

| LINK | ACCOMMODATED PATHS (Bandwidth Used) | | | | | | | REMAINING BANDWIDTH (Mbps) |
|---|---|---|---|---|---|---|---|---|
| | 50a (50) | 50b (30) | 50c (5) | 50d (60) | 50e (30) | 50f (5) | 50g (20) | |
| 30a | | | | | | | | Unavailable |
| 30b | | | | ○ | ○ | | | 60 |
| 30c | | | | | | | ○ | 130 |
| 30d | | | | | | | ○ | 130 |
| 30e | | | | | | | | 150 |
| 30f | | | | ○ | ○ | ○ | | 55 |
| 30g | | | | | | | | 150 |
| 30h | | | | | | ○ | | 145 |

LINK-PATH TABLE

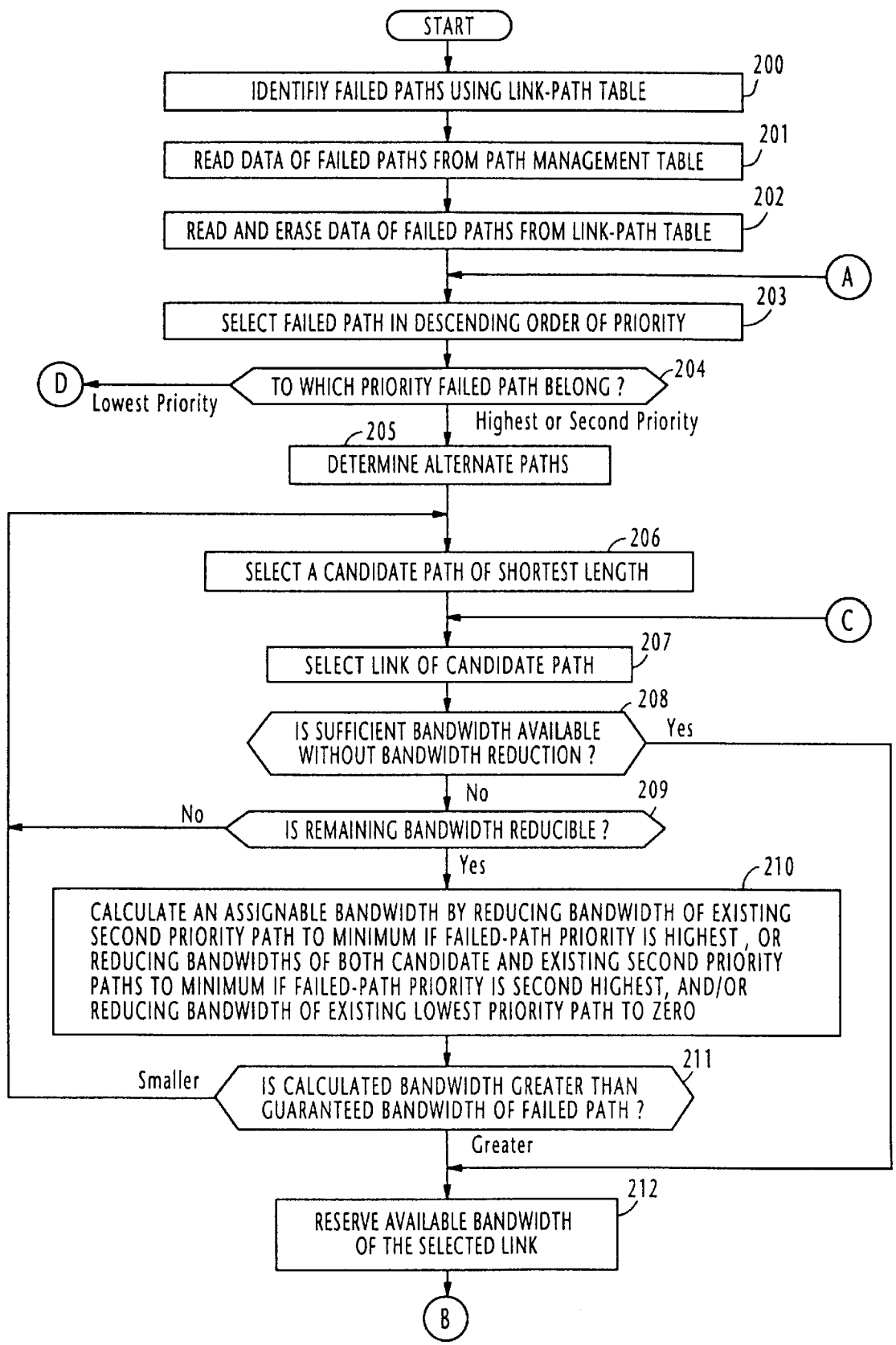

COMMUNICATION NETWORK RECOVERABLE FROM LINK FAILURE USING PRIORITIZED RECOVERY CLASSES

BACKGROUND OF THE INVENTION

1. Field of the Invention

The present invention relates to a self-healing network for ensuring continued communication service in the event of a link failure using alternate routes. The present invention is particularly suitable for ATM (asynchronous transfer mode) self-healing networks.

2. Description of the Related Art

In the event of a link failure in an ATM communication network, an alternate virtual path is selected so that its bandwidth guarantees the bandwidth used by the failed virtual path. A known fault recovery scheme involves the provisioning of pre-arranged alternate paths of same bandwidths as working paths and performing instant switching to the pre-arranged paths when the working paths fail. While the outage time can be reduced to a minimum, the disadvantage is that a significant amount of network resources is required.

According to another well known method, path-finding messages are broadcast through the network for making a search through all possible paths which may exist between failure-affected nodes for an alternate path having the same bandwidth as the failed path. If a path of the same bandwidth is detected, the affected path is switched to the detected path. Since the path-finding messages are affected by the amount of traffic carried through the network, it is difficult to guarantee the recovery of the same bandwidth and hence the continuity of service.

Another technique, as disclosed in Japanese Laid-Open Patent Specification Hei 7-235923, involves the provisioning of pre-established "connections" of zero bandwidth corresponding to working paths. When a link failure occurs in a working path, an alternate path is formed by allocating the same bandwidth to the corresponding pre-established connection. However, this technique suffers from the same problem as the path-finding technique because of the difficulty in guaranteeing the required bandwidth for the pre-established connection.

SUMMARY OF THE INVENTION

It is therefore an object of the present invention to provide a communication network that guarantees bandwidths necessary for continued operation of the network in the event of a link failure.

According to one aspect of the present invention, there is provided a communication network comprising a plurality of network nodes interconnected by communication links, the links accommodating virtual paths that extend between a plurality of user terminals, the virtual paths being respectively identified by priority classes which guarantee a different amount of bandwidth. In a link-path table, the links are mapped to the accommodated virtual paths and to bandwidths remaining in the respective links. A controller is responsive to a fault-indicating message identifying a failed virtual path received from at least one network node for making a search through the link-path table for an alternate virtual path and a remaining bandwidth of each link that comprises the alternate virtual path. In a preferred embodiment, the search through the link-path table is made in descending order of the priority classes. In accordance with the priority class of the failed virtual path relative to the priority class of an existing virtual path sharing the link with the alternate virtual path, the controller determines whether or not the bandwidth guaranteed by the priority class of the failed virtual path can be allocated to the alternate virtual path from the remaining bandwidth, and establishes the alternate virtual path if the guaranteed bandwidth can be allocated.

According to a further aspect, the present invention provides a fault recovery method for a communication network comprising a plurality of network nodes interconnected by communication links, the links accommodating virtual paths that extend between a plurality of user terminals. The method comprises the steps of assigning priority classes to the virtual paths to guarantee a different amount of bandwidth, mapping, in a memory, the links to the accommodated virtual paths and to bandwidths remaining in the respective links, and making a search, in response to a fault-indicating message identifying a failed virtual path, through the memory and detecting a plurality of alternate virtual paths and a remaining bandwidth of each one of a plurality of the links that comprises each of the alternate virtual paths. One of the alternate virtual paths is selected, and for the selected alternate virtual path, one of the links is selected. The method proceeds to determine whether or not the bandwidth guaranteed by the priority class of the failed virtual path can be allocated to the selected alternate virtual path from the remaining bandwidth of the selected link in accordance with the priority class of the failed virtual path relative to the priority class of an existing virtual path sharing the selected link with the selected alternate virtual path. The selected link is successively shifted to the next and the determination process is repeated on the shifted link. When all the links are tested in this manner, the selected alternate virtual path is established if it is determined that the guaranteed bandwidth can be allocated for all links of the selected alternate virtual path. Otherwise, the next alternative virtual path is selected and the determination process is repeated.

BRIEF DESCRIPTION OF THE DRAWINGS

The present invention will be described in further detail with reference to the accompanying drawings, in which:

FIGS. 4A to 4C are illustrations of a link-path table of different contents updated with data obtained during a fault recovery process;

FIGS. 5A and 5B are flowcharts of operation of the controller of network control system.

DETAILED DESCRIPTION

Figure 1:
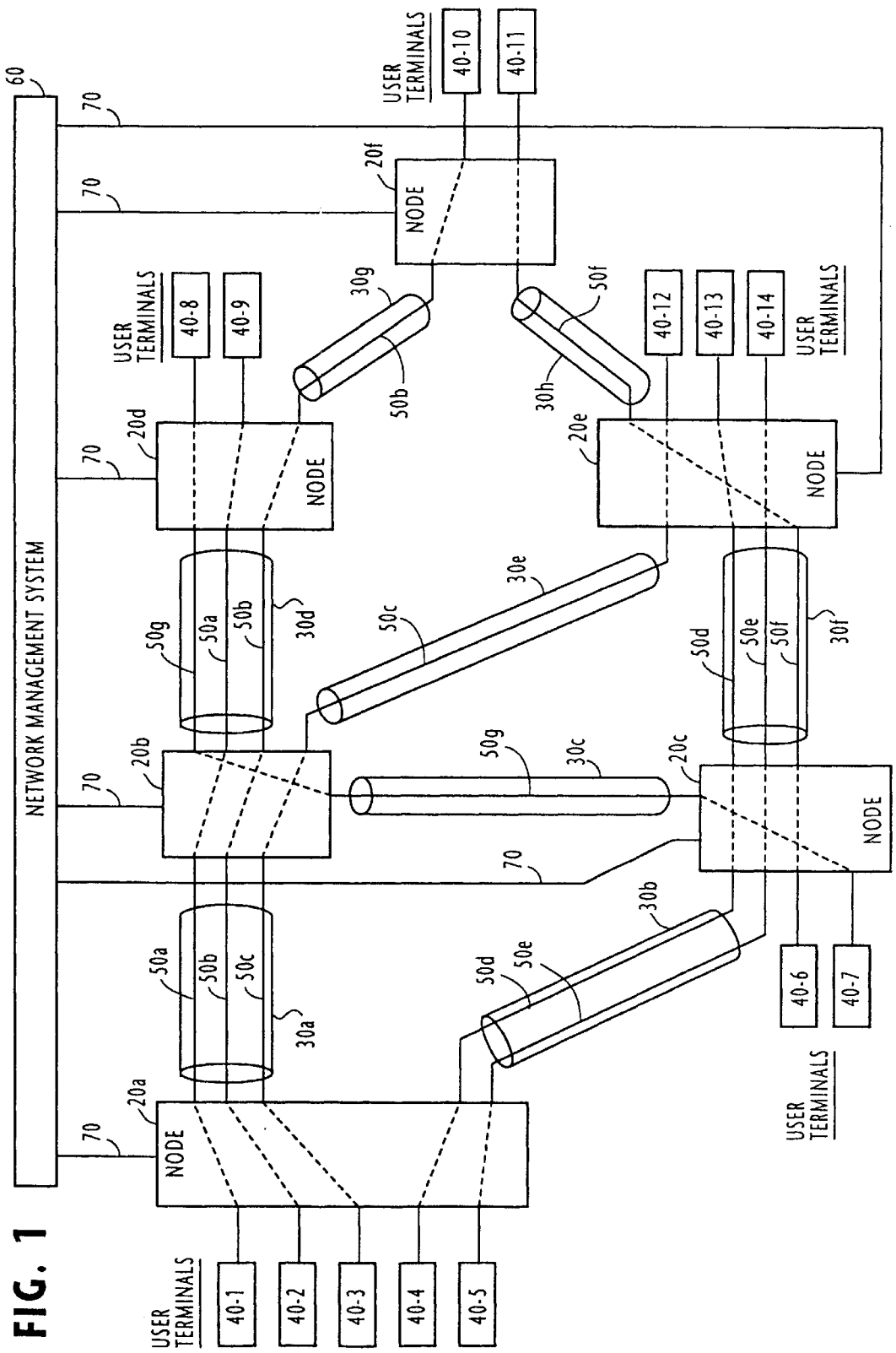
FIG. 1 is a block diagram of a communication network incorporating a fault recovery system of the present invention.

In FIG. 1, a fault tolerant communication network is shown in simplified form for illustrating the fault recovery principle of the present invention. The network is formed by a plurality of ATM (asynchronous transfer mode) cross-connect nodes 20a to 20f interconnected by communication links 30a to 30h. These communication links are used by the network nodes to establish virtual paths 50a to 50g for interconnecting a plurality of user terminals 40-1 to 40-14. For example, virtual path 50a is established between terminals 40-1 and 40-9 via nodes 20a, 20b and 20d, using links 30a and 30d, and virtual path 50b is established between terminals 40-2 and 40-10 via nodes 20a, 20b, 20d and 20f, using links 30a, 30d and 30g. A network management system 60 is connected to all nodes of the network via a plurality of network control links 70.

Figures 2, 3:
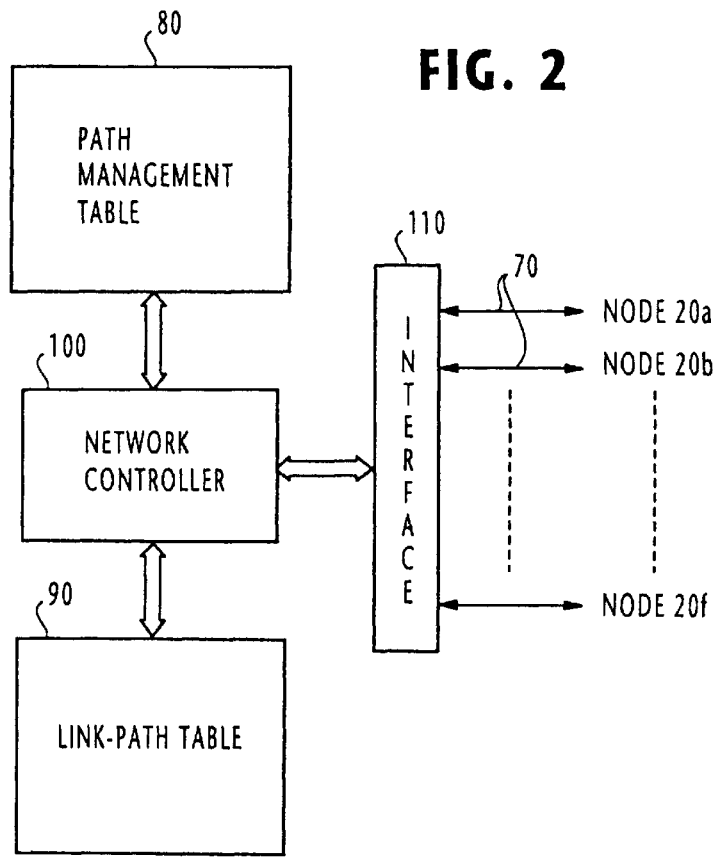
FIG. 2 is a schematic block diagram of a network control system.
FIG. 3 is an illustration of a path management table.

As shown in FIG. 2, the network management system 60 includes a path management table 80 and a link-path table 90. The control links 70 from all nodes of the network are connected to a network controller 100 via an interface 110. In the event of a link failure, the controller 100 is informed of the failure and takes necessary fault recovery actions by issuing command messages to the nodes concerned, using data stored in the path management table 80 and the link-path table 90.

In the path management table 80, shown in FIG. 3, all virtual paths 50a to 50g are mapped to a corresponding pair of terminal nodes to which the ends of each virtual path are terminated. Each virtual path is further indicated by a fault recovery class and the bandwidth (Mbps) currently used by the virtual path. Three fault recovery classes are provided in the network according to three priority levels, i.e., highest, second and lowest priority level. The priority of the highest level guarantees the recovery of 100% bandwidth and the priority of the second level guarantees the recovery of a predetermined minimum bandwidth. The lowest priority guarantees the recovery of a virtual path connection, but no bandwidth is guaranteed for the recovered connection.

As a typical example, assume that each link has a capacity of 150 Mbps. FIG. 3 shows that virtual paths 50a, 50d and 50g belong to the highest priority recovery class and are currently using bandwidths of 50, 60 and 20 Mbps, respectively. The recovery of their bandwidth is 100% guaranteed. Virtual paths 50b and 50e belong to the second priority recovery class and are currently using bandwidths of 30 Mbps. For these virtual paths, the recovery of a predetermined minimum amount of bandwidth, for example, 10 Mbps, is guaranteed, regardless of their current bandwidth. Virtual path 50c and 50f, currently using 5 Mbps, are of lowest priority. For these lowest priority paths, the recovery of connections is guaranteed, but there is no guarantee of bandwidth.

FIG. 4A illustrates the link-path table 90 in its initial state, where links 30a to 30h are mapped to virtual paths that are accommodated by the respective links and the amount of bandwidth remaining in each of the links. Link 30a, for example, is mapped to virtual paths 50a, 50b and 50c and a bandwidth of 80 Mbps is indicated as remaining in the link 30a.

Figure 5B:
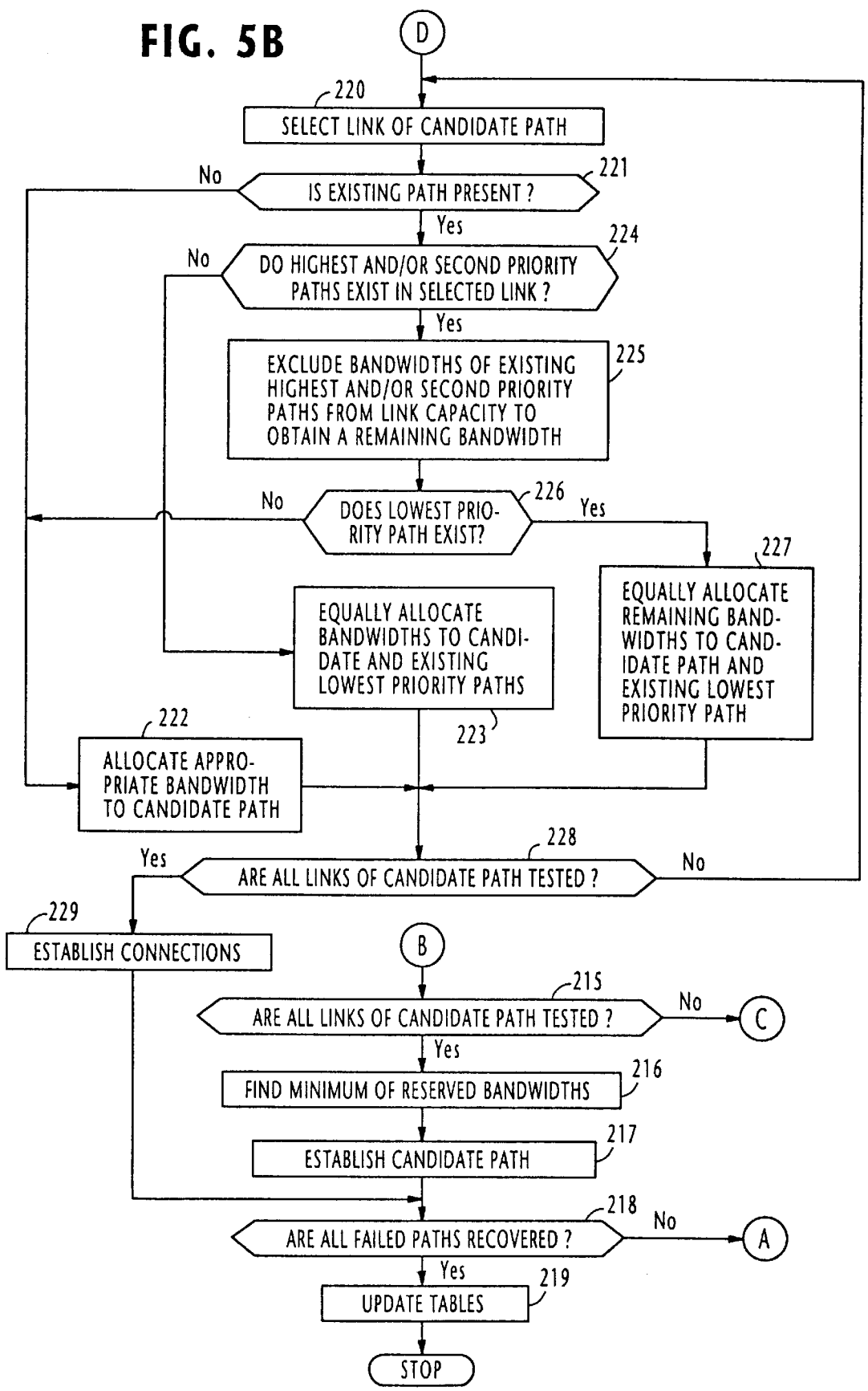

The controller 100 is programmed to use both of the tables 80 and 90 to take a recovery action according to the flowcharts shown in FIGS. 5A, 5B and 5C when it is informed of a link failure.

When the controller is informed of a link failure, the program execution starts with block 200, FIG. 5A, where the controller looks up the link-path table 90 of FIG. 4A to identify the virtual paths accommodated by the failed link. Therefore, if a failure occurs in link 30a, the controller will recognize that virtual circuits 50a, 50b and 50c have failed. Flow proceeds to block 201 to read the terminal nodes, the recovery class of the failed paths and their current bandwidths from the path management table 80.

In block 202, the controller reads and erase the path identity and bandwidth data of the failed paths from the link-path table 90. In block 203, the controller selects one of the failed paths in descending order of priority. The highest priority failed path is therefore initially selected. Then, the controller proceeds to block 204 to check to see to which priority class the selected failed path belongs. If the selected failed path belongs to the highest or second priority class, the controller proceeds from block 205 to determine possible alternate paths for the selected failed path by using tables 80 and 90, and proceeds to block 206 to select one of the alternate paths for the selected failed path as a candidate path in ascending order of path length. In block 207, the controller selects on the links that comprise the selected candidate path.

Flow proceeds to block 208 to determine whether the bandwidth remaining in the selected link of the candidate path is available for the recovery of the selected failed path without bandwidth reduction of both candidate and existing second and/or lowest priority paths. If so, the controller recognizes that the failed path can be recovered using the selected link and flow proceeds to block 212 to reserve the bandwidth available for the failed path without bandwidth reduction.

If the remaining bandwidth is not available without the bandwidth reduction, flow proceeds from block 208 to block 209 to determine whether the remaining bandwidth is reducible. If not, the controller recognizes that the selected link cannot be used for the recovery of the selected failed path and flow returns from block 209 to block 206 to select the next candidate path.

If the remaining bandwidth is rendered available by reducing the bandwidths of the existing and candidate paths, flow proceeds from block 209 to block 210 to calculate an assignable bandwidth by reducing bandwidths of the existing second priority path to predetermined minimum value if the failed-path priority highest, or reducing the bandwidths of both candidate and existing second priority paths to minimum if the failed-path priority is second highest, and/or further reducing the bandwidth of existing lowest priority path to zero regardless of whether the failed-path priority is highest or second highest.

In block 211, the controller checks to see if the calculated bandwidth is greater than the guaranteed bandwidth of the failed path in question. If the calculated bandwidth is smaller than the guaranteed bandwidth, the controller recognizes that the selected link is not usable for the path recovery and flow proceeds from block 211 to block 206 to select the next candidate. If the calculated bandwidth is equal to or greater than the guaranteed bandwidth, the controller proceeds to block 212 to reserve the guaranteed bandwidth in the selected link. Flow proceeds now to block 215.

If the above process is not yet complete for all links of the selected candidate path, the controller exits decision block 215 and returns to block 207 to select the next link of the selected candidate path to repeat the verification process.

If the above process has been performed on all possible links of a selected candidate path, the controller proceeds from block 215 to block 216 to detect a minimum value of the reserved bandwidths. Since some of the links of a given alternate path has a greater remaining bandwidth than the other links of the path, such links will allocate bandwidths without reduction to the guaranteed value. Therefore, in such instances, the guaranteed bandwidth will be detected in block 216 as a minimum value.

In block 217, the candidate path is established using the minimum of the bandwidths reserved in the links of the selected candidate path, and proceeds to block 218 to determine whether all the failed paths have been recovered.

If the decision in block 204 reveals that the failed path selected in block 204 belongs to the lowest priority recovery class, the controller proceeds to block 220 (FIG. 5B) to select one of the links of the candidate path currently selected. In block 221, the controller checks to see if there is an existing path in the selected link. If not, flow proceeds from block 221 to block 222 to allocate appropriate bandwidth to the candidate path and proceeds to block 228 to determine if all links of the candidate path have been tested. If not, the controller returns to step 220 to repeat the process.

If it is determined, in block 221, that there is at least one existing path in the selected link of the candidate path, the controller proceeds to block 224 to check to see if highest and/or second priority paths exist in the selected link of the candidate path. If there is none, at least one lowest priority path may exist, the decision in block 222 is negative and the controller proceeds from block 222 to block 223 to equally allocate bandwidths to the existing and candidate paths, and proceeds to block 228.

If the decision, in block 224, is affirmative, flow proceeds to block 225 to exclude the bandwidths of existing highest and/or second priority paths from the maximum link capacity to obtain a remaining bandwidth and proceeds to block 206. If a lowest priority path exists in the selected link (block 226), the controller proceeds to block 227 to equally divide the remaining bandwidth and allocates the divided bandwidths to the candidate and lowest priority paths, and proceeds to block 228. If no lowest priority path exists in the selected link, flow proceeds from block 226 to block 222 to allocate an appropriate bandwidth to the candidate path.

If it is determined that all links of the selected candidate path have been tested (block 228), the controller proceeds to block 229 to establish connections through the verified links to recover the failed path.

In this way, the failed paths are successively selected in descending order of priority level and the above process is repeated on the selected failed paths. When all the failed paths are recovered, the decision in block 218 is affirmative and flow proceeds to block 219 to update the path management table 80 and link-path table 90 to reflect the changes in the network.

Figure 4B:

Assume that a failure has occurred between nodes 20a and 20b, affecting the link 30a accommodating virtual paths 50a, 50b and 50c. As indicated in FIG. 4A, the controller 60 in the network management system looks up the link-path table 90 and knows that paths 50a, 50b and 50c have failed and examines the path management table 80 in FIG. 3 to recognize that the affected virtual paths 50a, 50b and 50c are of highest, second and lowest priority classes, respectively, and are currently using 50, 15 and 5 Mbps, respectively. The path data of these failed paths are read from the link link-path table 90 and erased as shown in FIG. 4B (see block 202, FIG. 5A) and alternate paths are determined (block 205).

Figure 4C:
Figure 6:
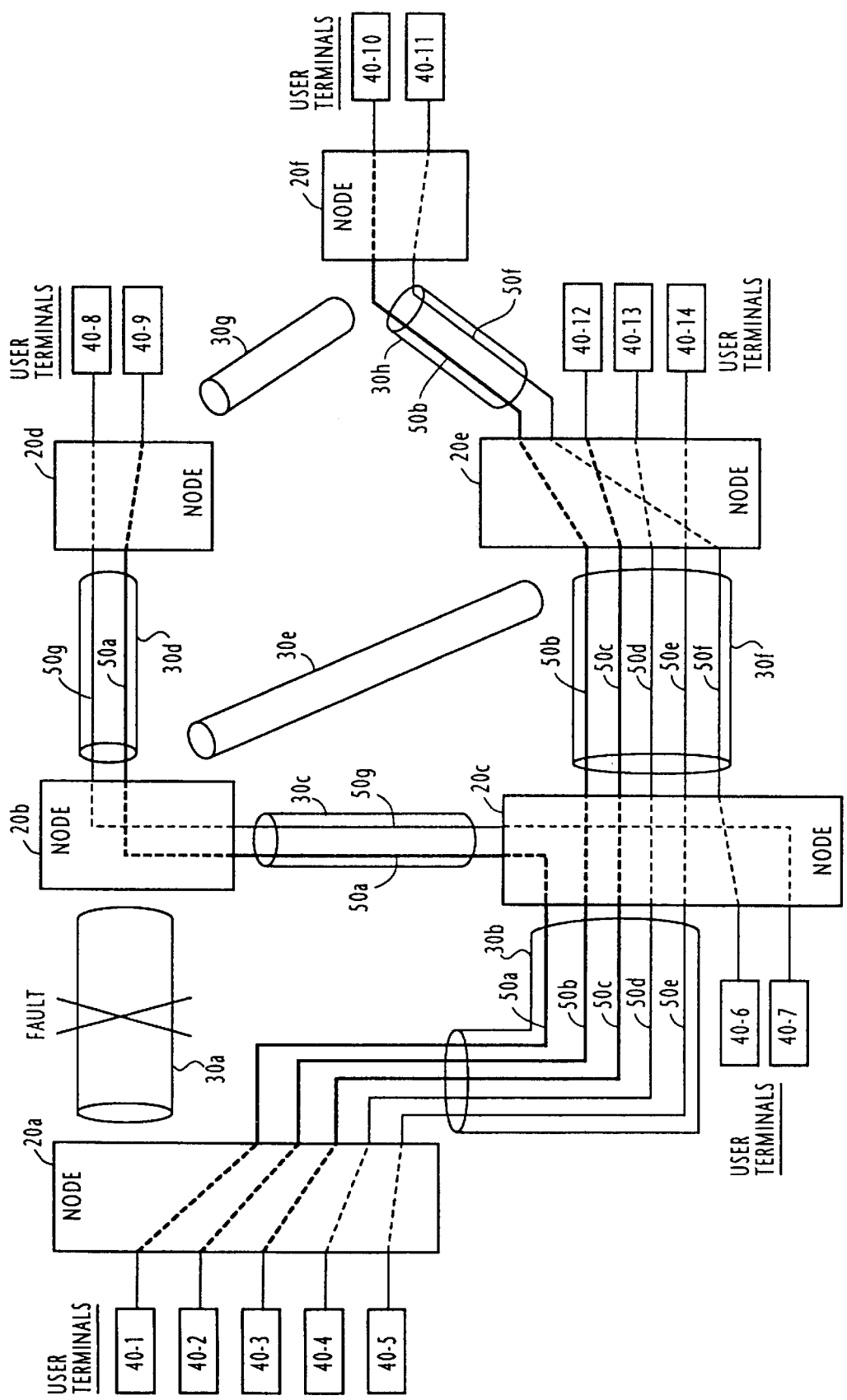
FIG. 6 is a block diagram of the communication network illustrating alternate virtual paths replacing failed virtual paths.

FIG. 6 illustrates a typical example of a fault recovery operation for the failed paths 50a, 50b and 50c, in which the minimum guaranteed bandwidth is assumed to be 10 Mbps. The controller issues command messages to all nodes of the network to recover the virtual path 50a via links 30b, 30c, 30d, the virtual path 50b via links 30b, 30f and 30h, and the virtual path 50c via links 30b and 30f, and when block 219 is executed the link-path table 90 is updated as shown in FIG. 4C. In the illustrated example, the original bandwidth of the 100%-guaranteed path 50a is recovered without reducing the bandwidth of existing paths due to the availability of the alternate links. In addition, the minimum guaranteed path 50b is recovered by reducing its bandwidth from 30 to 10 Mbps with negotiation with the existing minimum-guaranteed path 50e, which is also reduced from 30 to 10 Mbps due to insufficient bandwidth in the alternate link 30b.

While a centralized network management system has been described, the present invention could equally be applied to distributed network managers as well by respectively maintaining the tables 80 and 90 and updating them by exchanging control messages between the nodes concerned.

What is claimed is:

1. A communication network comprising:
   a plurality of network nodes interconnected by communication links, said links accommodating virtual paths that extend between a plurality of user terminals, said virtual paths being respectively identified by priority classes which guarantee a different amount of bandwidth;
   a link-path table for mapping said links to said accommodated virtual paths and to bandwidths remaining in the respective links; and
   a controller responsive to a fault-indicating message identifying a failed virtual path received from at least one network node for making a search through the link-path table for an alternate virtual path and a remaining bandwidth of each link that comprises the alternate virtual path, determining whether or not the bandwidth guaranteed by the priority class of the failed virtual path can be allocated to the alternate virtual path from the remaining bandwidth in accordance with the priority class of the failed virtual path relative to the priority class of an existing virtual path sharing said each link with said alternate virtual path, and establishing the alternate virtual path if it is determined that the guaranteed bandwidth can be allocated.

2. A communication network as claimed in claim 1, wherein said controller is arranged to establish said alternate virtual path by reducing the bandwidth of said existing virtual path when the priority class of the failed virtual path is higher than the priority class of the existing virtual path.

3. A communication network as claimed in claim 2, wherein the bandwidth of said existing virtual path is reduced to a value equal to the guaranteed bandwidth of the existing virtual path.

4. A communication network as claimed in claim 1, wherein said controller is arranged to make said search in descending order of said priority classes if a plurality of said virtual paths fail.

5. A communication network as claimed in claim 1, further comprising a path management table for mapping said virtual paths to said priority classes, said controller making a search through the path management table in response to said fault-indicating message for determining the priority class of the failed virtual path.

6. A communication network as claimed in claim 5, wherein said path management table further maps each of said virtual paths to a pair of terminal network nodes to which ends of the virtual path are respectively terminated.

7. A communication network as claimed in claim 1, wherein said controller is arranged to establish said alternate virtual path if a bandwidth used by a virtual path existing in a link of the alternate virtual path can be reduced to a value equal to the guaranteed bandwidth of the failed virtual path.

8. A communication network as claimed in claim 1, wherein one of said priority classes guarantees a full bandwidth recovery for the failed virtual path.

9. A communication network as claimed in claim 8, wherein a second one of said priority classes guarantees a recovery of a predetermined minimum bandwidth for the failed virtual path regardless of the bandwidth used by the failed virtual path.

10. A communication network as claimed in claim 8, wherein a third one of said priority classes guarantees establishment of connections through the alternate virtual path.

11. A communication network as claimed in claim 1, wherein one of said priority classes guarantees a recovery of a predetermined minimum bandwidth for the failed virtual path regardless of the bandwidth used by the failed virtual path and another priority class guarantees establishment of connections through the alternate virtual path.

12. A communication network as claimed in claim 1, wherein each of said network nodes comprises an asynchronous transfer mode cross-connect node.

13. A fault recovery method for a communication network comprising a plurality of network nodes interconnected by communication links, said links accommodating virtual paths that extend between a plurality of user terminals, the method comprising the steps of:
   a) assigning priority classes to said virtual paths to guarantee a different amount of bandwidth;
   b) mapping, in a memory, said links to said accommodated virtual paths and to bandwidths remaining in the respective links;
   c) making a search, in response to a fault-indicating message identifying a failed virtual path, through the memory and detecting an alternate virtual path and a remaining bandwidth of each of said links that comprises the alternate virtual path;
   d) determining whether or not the bandwidth guaranteed by the priority class of the failed virtual path can be allocated to the alternate virtual path from the remaining bandwidth in accordance with the priority class of the failed virtual path relative to the priority class of an existing virtual path sharing said each link with said alternate virtual path; and
   e) establishing the alternate virtual path if it is determined that the guaranteed bandwidth can be allocated.

14. The method of claim 13, wherein the step (d) comprises making said search through the link-path table in descending order of said priority classes if a plurality of said virtual paths fail.

15. The method of claim 13, wherein the step (e) comprises establishing said alternate virtual path by reducing the bandwidth of an existing virtual path sharing said each link with the alternate virtual path when the priority class of the failed virtual path is higher than the priority class of the existing virtual path.

16. The method of claim 15, wherein the bandwidth of said existing virtual path is reduced to a value equal to the guaranteed bandwidth of the existing virtual path.

17. The method of claim 13, wherein the step (d) comprises:
   calculating an assignable bandwidth of one of said links by reducing the bandwidth of an existing virtual path sharing said one link with said alternate virtual path if the priority class of the failed virtual path is higher than the priority class of the existing virtual path, or calculating an assignable bandwidth of said one link by reducing the bandwidths of said existing virtual path and said alternate virtual path if the priority class of the failed virtual path is equal to the priority class of the existing virtual path; and
   determining whether or not the calculated bandwidth is greater than the guaranteed bandwidth of the failed virtual path, and wherein the step (e) comprises:
   establishing the alternate virtual path if it is determined that the calculated bandwidth is greater than the guaranteed bandwidth of the failed virtual path.

18. The method of claim 13, wherein the step (d) is repeated on each of said links that comprise said alternate virtual path.

19. A fault recovery method for a communication network comprising a plurality of network nodes interconnected by communication links, said links accommodating virtual paths that extend between a plurality of user terminals, the method comprising the steps of:
   a) assigning priority classes to said virtual paths to guarantee a different amount of bandwidth;
   b) mapping, in a memory, said links to said accommodated virtual paths and to bandwidths remaining in the respective links;
   c) making a search, in response to a fault-indicating message identifying a failed virtual path, through the memory and detecting a plurality of alternate virtual paths and a remaining bandwidth of each one of a plurality of said links that comprises each of the alternate virtual paths;
   d) selecting one of said alternate virtual paths;
   e) selecting one of said links;
   f) determining whether or not the bandwidth guaranteed by the priority class of the failed virtual path can be allocated to the selected alternate virtual path from the remaining bandwidth of said selected link in accordance with the priority class of the failed virtual path relative to the priority class of an existing virtual path sharing said selected link with said selected alternate virtual path;
   g) repeating the steps (e) and (f) for all links of the selected alternate virtual path; and
   h) establishing the selected alternate virtual path if it is determined that the guaranteed bandwidth can be allocated for all links of the selected alternate virtual path, and repeating the steps (d) to (f) if it is determined that the guaranteed bandwidth cannot be allocated for at least one of said links of the selected alternate virtual path.

20. The method of claim 19, wherein the step (f) comprises:
   calculating an assignable bandwidth of one of said links by reducing the bandwidth of an existing virtual path sharing said one link with said alternate virtual path if the priority class of the failed virtual path is higher than the priority class of the existing virtual path, or calculating an assignable bandwidth of said one link by reducing the bandwidths of said existing virtual path and said alternate virtual path if the priority class of the failed virtual path is equal to the priority class of the existing virtual path; and
   determining whether or not the calculated bandwidth is greater than the guaranteed bandwidth of the failed virtual path, and wherein the step (h) comprises:
   establishing the selected alternate virtual path if it is determined that the calculated bandwidth is greater than the guaranteed bandwidth of the failed virtual path, and repeating the steps (d) to (f) if it is determined that the calculated bandwidth is not greater than the guaranteed bandwidth of the failed virtual path.

* * * * *